United States Patent [19]
Markandey

[11] Patent Number: 5,680,487
[45] Date of Patent: Oct. 21, 1997

[54] SYSTEM AND METHOD FOR DETERMINING OPTICAL FLOW

[75] Inventor: Vishal Markandey, Dallas, Tex.

[73] Assignee: Texas Instruments Incorporated, Dallas, Tex.

[21] Appl. No.: 237,946

[22] Filed: May 2, 1994

Related U.S. Application Data

[63] Continuation of Ser. No. 816,426, Dec. 23, 1991, abandoned.

[51] Int. Cl.$^6$ ............................................... G06K 9/20
[52] U.S. Cl. ........................ 382/291; 382/103; 382/302
[58] Field of Search .................................. 382/216, 212, 382/302, 312, 103, 107, 226, 227, 291, 294, 299, 300; 348/153, 154, 155

[56] References Cited

U.S. PATENT DOCUMENTS

| | | | |
|---|---|---|---|
| 5,016,173 | 5/1991 | Kenet et al. | 382/22 |
| 5,048,103 | 9/1991 | Leclerc et al. | 382/44 |

OTHER PUBLICATIONS

"Determining Optical Flow", *Artificial Intelligence*, 17, (1981) pp. 185–203, by Horn et al.

"The Laplacian Pyramid as a Compact Image Code", IEEE Transactions on Communications, vol. Com–31, No. 4, Apr. 1983 pp. 532–540, by Burt et al.

"Object Tracking with a Moving Camera, An Application of Dynamic Motion Analysis", IEEE, Sep. 1989, pp. 2–12, by Burt et al.

"Constraints for the Computation of Optical Flow", IEEE, 1989, pp. 116–124, by Girosi et al.

"Optical Flow Techniques for Moving Target Detection", SPIE, vol. 1383 Sensor Fusion III: 3–D Perception and Recognition, 1990, pp. 60–71, by Russo et al.

*Primary Examiner*—Yon J. Couso
*Attorney, Agent, or Firm*—W. Daniel Swayze, Jr.; Richard L. Donaldson; W. James Brady, III

[57] ABSTRACT

A method and system are provided for determining optical flow between first and second images. First and second multiresolution images are generated (108, 110) from the first and second images, respectively, such that each multiresolution image has a plurality of levels of resolution. A multiresolution optical flow field is initialized (112) at a first one of the resolution levels. At each resolution level higher than the first resolution level, a residual optical flow field is determined (120) at the higher resolution level, and the multiresolution optical flow field is updated (122) by adding the residual optical flow field.

8 Claims, 6 Drawing Sheets

FIG. 7c

SYSTEM AND METHOD FOR DETERMINING OPTICAL FLOW

This application is a Continuation of application Ser. No. 07/816,426, filed Dec. 23, 1991 now abandoned.

TECHNICAL FIELD OF THE INVENTION

This invention relates in general to image processing and in particular to a method and system for determining optical flow.

BACKGROUND OF THE INVENTION

Moving Sensor moving target indication ("MSMTI") techniques can automatically detect motion of a moving target, based upon a sequence of images acquired by a moving sensor. In military applications, such MSMTI techniques are used to detect motion of a target moving either along the ground or through the air, based upon images acquired by either a ground or air based moving sensor.

When images are acquired by a moving sensor, image motion can result either (1) from movement of the target or (2) from movement of the background due to movement of the sensor. Frequently, image motion resulting from target movement is either significantly smaller than or approximately equal in magnitude to image motion resulting from background movement. Moreover, background movement is sometimes complex and non-uniform due to the effects of sensor maneuvering and to the perspective effects of distance and angle. Thus, it is desirable for an MSMTI technique to be sufficiently accurate (1) to determine target movement even if target movement is significantly smaller than background movement, (2) to determine a small difference between target movement and background movement, and (3) to distinguish target movement from the effects of sensor maneuvering and the perspective effects of distance and angle. The accuracy of an MSMTI technique can be improved by improving the accuracy of an optical flow field determined between successive images acquired by the moving sensor. By accurately determining such an optical flow field, target movement between the successive images can be accurately determined.

Thus, a need has arisen for a method and system for determining optical flow, which accurately determines target movement between successive images. A need has also arisen for a method and system for determining optical flow, which determines target movement even if target movement is significantly smaller than background movement. Moreover, a need has arisen for a method and system for determining optical flow, which accurately determines a small difference between target movement and background movement. Finally, a need has arisen for a method and system for determining optical flow, which distinguishes target movement from the effects of sensor maneuvering and the perspective effects of distance and angle.

SUMMARY OF THE INVENTION

In a method and system for determining optical flow between first and second images, first and second multiresolution images are generated from the first and second images, respectively, such that each multiresolution image has a plurality of levels of resolution. A multiresolution optical flow field is initialized at a first one of the resolution levels. At each resolution level higher than the first resolution level, a residual optical flow field is determined at the higher resolution level, and the multiresolution optical flow field is updated by adding the residual optical flow field.

It is a technical advantage of the present invention that target movement between successive images is accurately determined.

It is a further technical advantage of the present invention that target movement is determined even if target movement is significantly smaller than background movement.

It is another technical advantage of the present invention that a small difference between target movement and background movement can be accurately determined.

It is yet another technical advantage of the present invention that target movement is distinguished from the effects of sensor maneuvering and the perspective effects of distance and angle.

BRIEF DESCRIPTION OF THE DRAWINGS

For a more comprehensive understanding of the present invention, and the advantages thereof, reference is now made to the following description, taken in conjunction with the accompanying drawings, in which:

FIG. 2a is a first image of the first target aircraft of FIG. 1a;

FIGS. 7a–c are exemplary images representing three pyramid levels, each for a different level of resolution of the image of FIG. 2a.

DETAILED DESCRIPTION OF THE PREFERRED EMBODIMENT

The preferred embodiment of the present invention and its advantages are best understood by referring to FIGS. 1 through 7 of the drawings, the same numerals being used for like and corresponding parts of the various drawings.

The accuracy of an MSMTI technique can be improved by improving the accuracy of an optical flow field determined between successive images acquired by a moving sensor. By accurately determining such an optical flow field, target movement between the successive images can be accurately determined. If image motion resulting from target movement is approximately equal or smaller in magnitude than image motion resulting from background movement, then conventional techniques may sometimes determine optical flow sufficiently for MSMTI. More sophisticated techniques are required to determine optical flow if target movement is significantly different in magnitude from background movement.

One typical previous MSMTI technique actually requires that target movement be significantly smaller than background movement. Under this previous MSMTI technique, a registered image output visually displays movement between successive images. Initially, the registered image output is generated at a low level of image resolution having a relatively small number of pixels. By definition, the maximum possible level of image resolution is equal to the resolution of the available images acquired by the moving sensor. Beginning at the initial low level of image resolution, the registered image output is modified to cancel or "register" larger elements of motion at each of several progressively higher levels of image resolution. If target movement is significantly smaller than background movement, then background movement is successively registered as the level of image resolution increases. At some level of image resolution, most of the background movement will have been registered, such that the registered image output visually displays primarily target movement. At this level of image resolution, the registration process is stopped. After the registration process is finished, image differencing techniques are used to enhance the registered image output's visual display of the moving target by computing a difference in gray scale pixel values between the successive images.

Figure 1A:
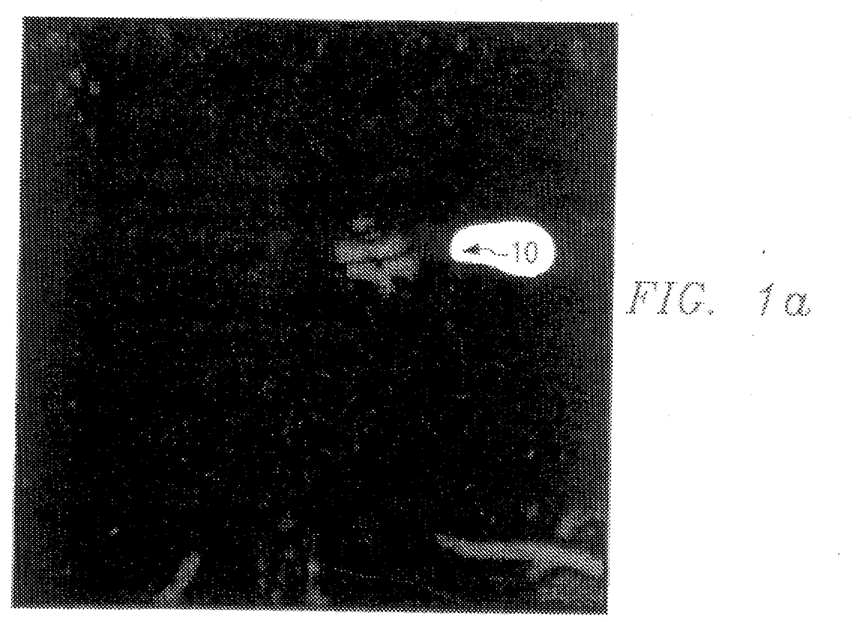
FIG. 1a is an exemplary visual display generated by a previous MSMTI technique for a first target aircraft.
Figure 1B:
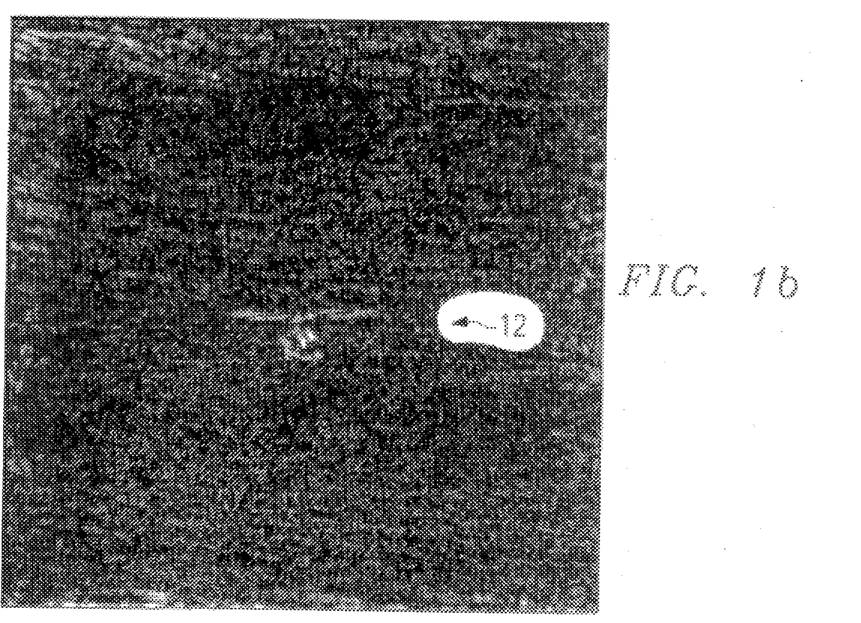
FIG. 1b is an exemplary visual display generated by the previous MSMTI technique for a second target aircraft.

FIG. 1a is an exemplary visual display generated by such a previous MSMTI technique for a first target aircraft, indicated generally at 10. FIG. 1b is an exemplary visual display generated by the previous MSMTI technique for a second target aircraft, indicated generally at 12. The images of FIGS. 1a–b have been scaled for visual interpretation and have been subjected to thresholding in order to remove background. As illustrated by the poor contrast between background and target in FIGS. 1a–b, the previous MSMTI technique provides only a very rough visual display of target movement.

A shortcoming of the previous MSMTI technique is that target movement might be registered together with background movement, particularly (1) if target movement is not significantly smaller in magnitude than background movement or (2) if the registration process continues through too high a level of resolution. If target movement is approximately equal in magnitude to background movement, then significant target movement is registered together with background movement, such that target movement is not appreciably distinguished from background movement. If target movement is greater than background movement, then target movement is registered before background movement. If the registration process continues through too high a level of resolution, then substantially all motion between successive images is erased, such that image differencing techniques are substantially unable to indicate the moving target. Significantly, therefore, the previous MSMTI technique fails to continue the registration process through to the highest possible level of image resolution. Alternatively, if the registration process fails to continue through a sufficiently high level of resolution, then an insufficient amount of background movement is registered, such that image differencing techniques are again substantially unable to indicate the moving target. Consequently, it is difficult to anticipate the level of resolution at which the registration process should be stopped, in order to register a sufficient amount of background movement without also registering a significant amount of target movement.

Significantly, the registration process of the previous MSMTI technique of FIGS. 1a–b fails to determine a comprehensive multiresolution optical flow field at the highest possible level of resolution, in which each pixel of a first image has an associated optical flow*** vector indicating the pixel's direction and magnitude of movement relative to a second image. The previous MSMTI technique fails to continue the registration process through to the highest possible level of image resolution. Instead, the previous MSMTI technique registers larger elements of motion as it progresses through to a less than maximum level of image resolution, so that a visual display of primarily small elements of motion remains. If target movement is significantly smaller than background movement, then the remaining primarily small elements of motion provide a very rough visual display of target movement. The very rough visual display of target movement is illustrated by the poor contrast between background and target in FIGS. 1a–b. If the registration process continued through to the maximum possible level of image resolution, then substantially all motion between successive images would be erased, such that image differencing techniques would be substantially unable to indicate the moving target.

In the preferred embodiment, a multiresolution pyramid based technique is used to accurately determine a comprehensive multiresolution optical flow field at the highest possible level of resolution, in which each pixel of a first image has an associated optical flow*** vector indicating the pixel's direction and magnitude of movement relative to a second image. Advantageously, the multiresolution optical flow determination technique of the preferred embodiment accurately determines target movement even if only a small difference exists between target movement and background movement. Moreover, the multiresolution optical flow determination technique of the preferred embodiment accurately determines target movement if target movement is significantly different in magnitude from background movement. Importantly, the multiresolution optical flow determination technique of the preferred embodiment determines optical flow at all levels of resolution in a multiresolution image pyramid by combining optical flow estimates from each resolution level with estimates from lower levels of resolution. In this manner, an optical flow field is incrementally compiled at each level of resolution in the multiresolution image pyramid to ultimately form a comprehensive multiresolution optical flow field at the pyramid's highest level of resolution. By definition, the pyramid's highest level of resolution is equal to the resolution of the available images acquired by a sensor.

Figure 2A:
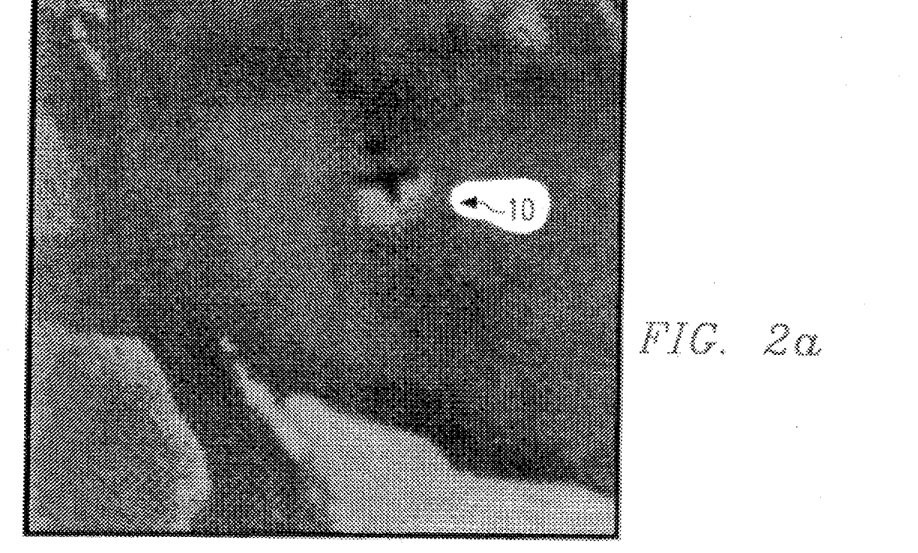
Figure 2B:
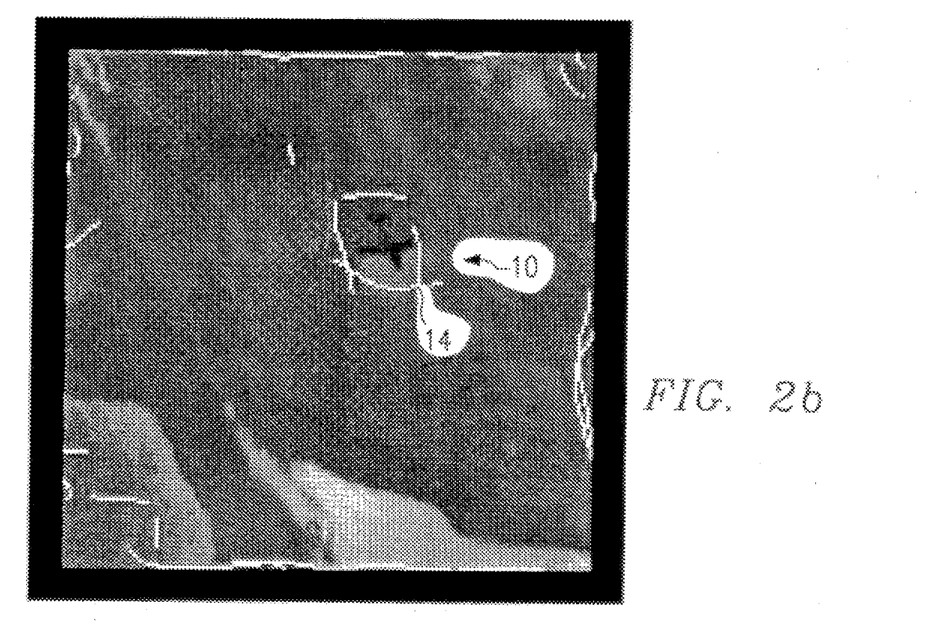
FIG. 2b is a second image of the first target aircraft of FIG. 1a, in which discontinuities are shown based upon a multiresolution optical flow field determination, according to the preferred embodiment.

FIG. 2a is a first image of the same first target aircraft 10 of FIG. 1a, acquired by a moving sensor at a first moment. FIG. 2b is a second image of the first target aircraft 10 of FIG. 1a, acquired by the moving sensor at a second moment. In FIG. 2b, the first target aircraft has sub-pixel motion relative to FIG. 2a. The apparent background motion resulting from sensor movement is approximately ten pixels between the image of FIG. 2a and the image of FIG. 2b.

Significantly, FIG. 2b shows the results of a discontinuity detection performed on a multiresolution optical flow field determined between FIGS. 2a and 2b according to the approach of the preferred embodiment. In FIG. 2b, discontinuities are overlaid in white relative to the image of FIG. 2a. Discontinuities detected from the multiresolution optical flow field according to the preferred embodiment form a well-defined border 14 around the target aircraft, such that FIG. 2b indicates target movement with superior resolution and contrast relative to FIG. 1a.

Figure 3A:
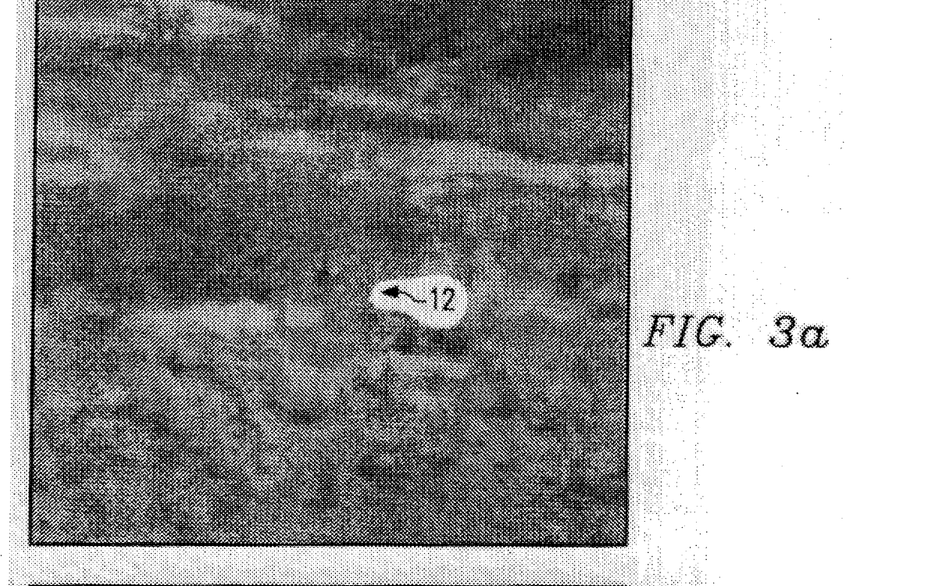
FIG. 3a is a first image of the second target aircraft of FIG. 1b.
Figure 3B:
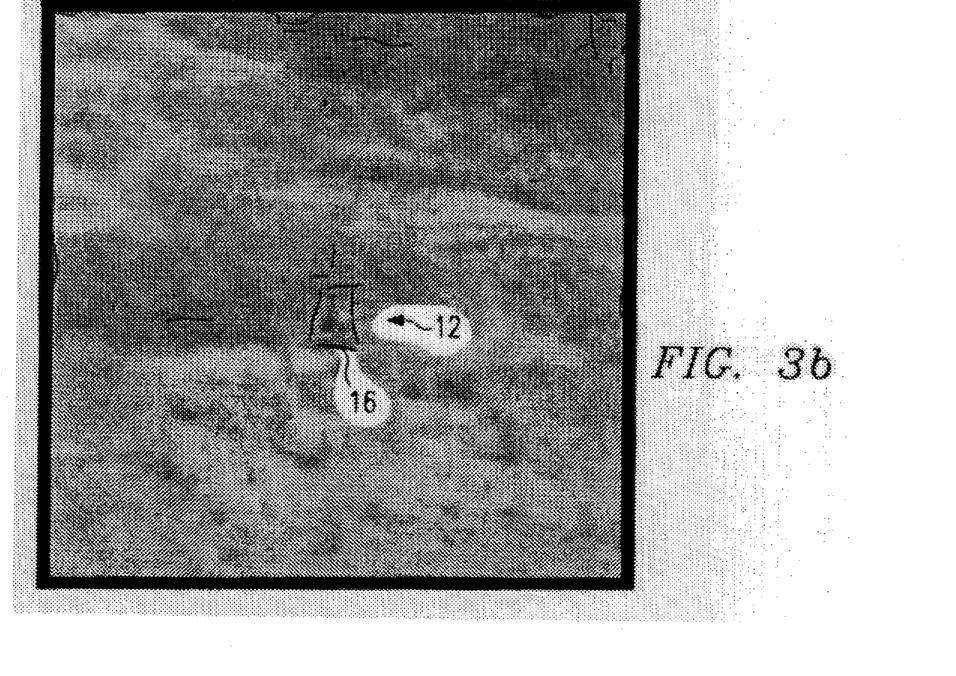
FIG. 3b is a second image of the second target aircraft of FIG. 1b, in which discontinuities are shown based upon a multiresolution optical flow field determination, according to the preferred embodiment.

FIG. 3a is a first image of the same second target aircraft 12 of FIG. 1b, acquired by a moving sensor at a first moment. FIG. 3b is a second image of the second target aircraft 12 of FIG. 1b, acquired by the moving sensor at a second moment. In FIG. 3b, the second target aircraft has motion of approximately 1–2 pixels relative to FIG. 3a. The apparent background motion resulting from sensor movement ranges from approximately 4–5 pixels at the top ends of the images of FIGS. 3a and 3b to approximately 9–10 pixels at the bottom ends of the images of FIGS. 3a and 3b, resulting from perspective effects of distance and angle.

Significantly, FIG. 3b shows the results of discontinuity detection performed on a multiresolution optical flow field determined between FIGS. 3a and 3b according to the approach of the preferred embodiment. In FIG. 3b, discontinuities are overlaid in black relative to the image of FIG. 3a. Discontinuities detected from the multiresolution optical flow field according to the preferred embodiment form a well-defined border 16 around the target aircraft, despite an otherwise poor contrast between the target aircraft and the background. Similar to FIG. 2b, FIG. 3b indicates target movement with superior resolution and contrast relative to FIG. 1b.

Figure 4:
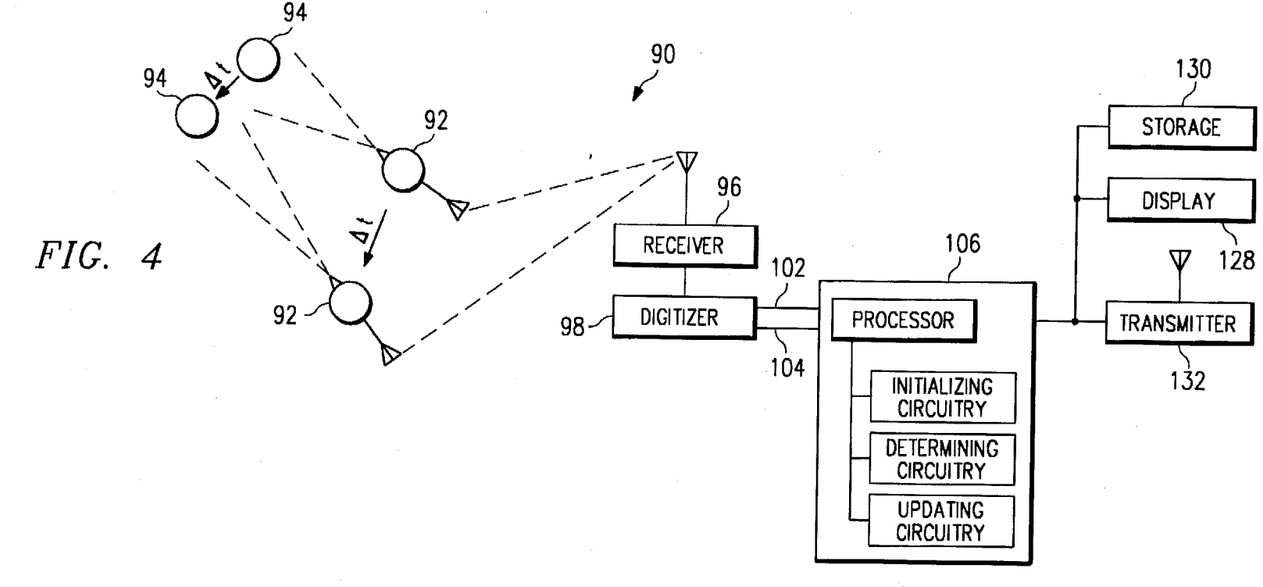
FIG. 4 is a block diagram of an MSMTI system applying the multiresolution optical flow determination technique, according to the preferred embodiment.

As FIGS. 2b and 3b demonstrate, the multiresolution optical field determination technique of the preferred embodiment provides significant technical advantages for MSMTI, relative to previous MSMTI techniques demonstrated in FIGS. 1a and 1b. FIG. 4 is a block diagram of an MSMTI system, indicated generally at 90, applying the multiresolution optical flow determination technique, according to the preferred embodiment. A moving sensor 92 tracks a moving target 94 and transmits radio signals representing the sensed target images to a receiver 96. For a first image sensed by sensor 92 at a first moment, digitizer 98 inputs the received radio signals from receiver 96 and outputs a digitized first image data set 102 ("Image 1"). For a second image sensed by sensor 92 at a second moment At time after the first moment, digitizer 98 inputs the received radio signals from receiver 96 and outputs a digitized second image data set 104 ("Image 2"). A processor 106 inputs Image 1 and Image 2 and then determines a multiresolution optical flow field and a discontinuity edge map as described further hereinbelow in connection with FIG. 5.

The multiresolution optical flow field and the discontinuity edge map are output by processor 106 and stored by storage 130. The discontinuity edge map is displayed by display 128 as illustrated in FIGS. 2b and 3b. Based on the multiresolution optical flow field and the discontinuity edge map, transmitter 132 transmits tracking control signals to sensor 92. Transmitter 132 further transmits information signals to a central controller (not shown), which can enable or disable multiple sensors in a coordinated fashion, based upon the multiresolution optical flow field and the discontinuity edge map.

Figure 5:
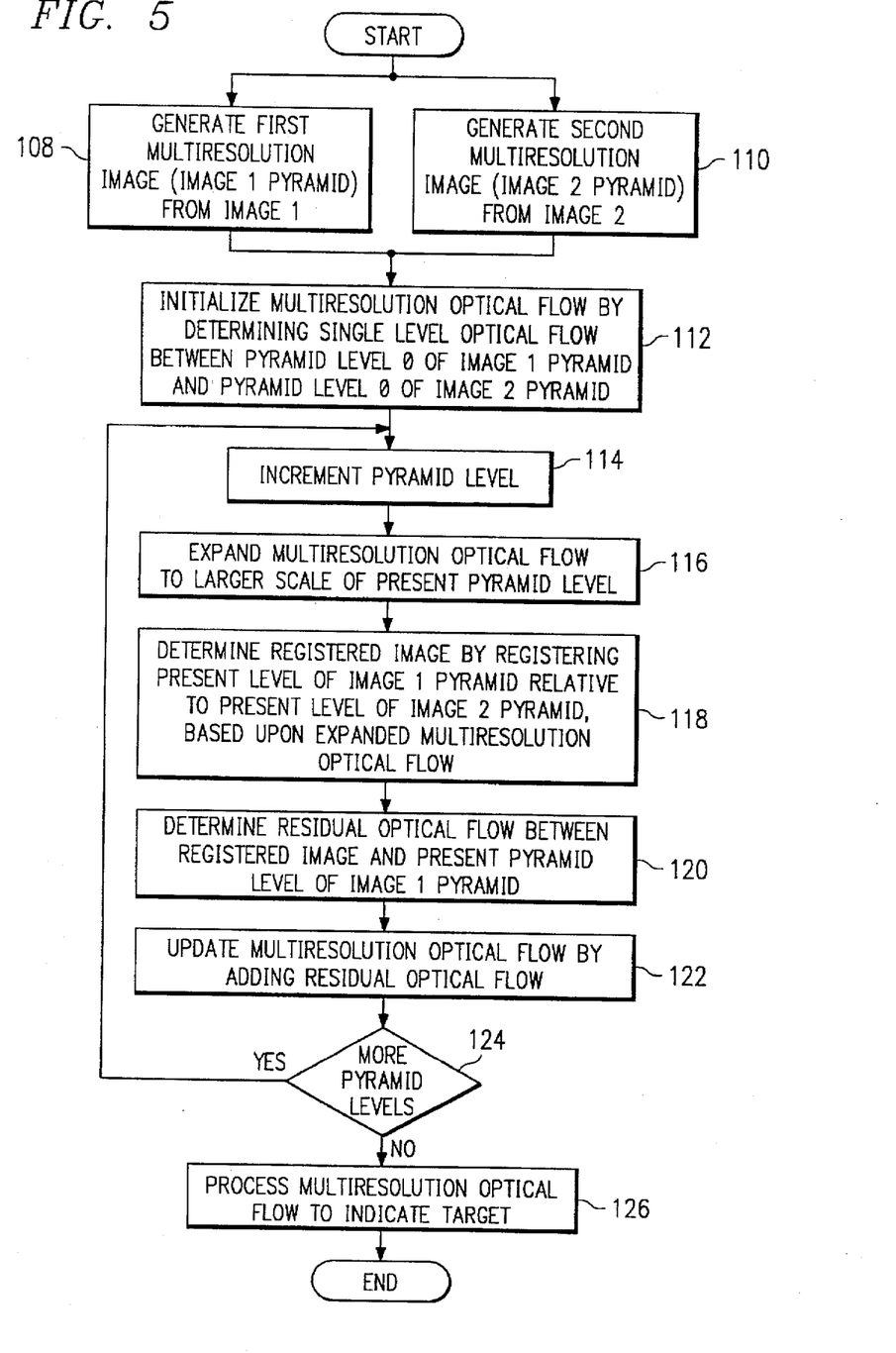
FIG. 5 is a flow chart of the multiresolution optical flow determination technique, according to the preferred embodiment.

FIG. 5 is a flow chart of the multiresolution optical flow determination technique of the preferred embodiment, which is executed by processor 106 of FIG. 4. In step 108, a first multiresolution image for Image 1 ("Image 1 Pyramid") is created by a multiresolution image pyramid generation technique. In step 110, a second multiresolution image ("Image 2 Pyramid") is created by the same multiresolution image pyramid generation technique for Image 2. A multiresolution image pyramid is created from an original image having a size of n×m pixels, so that images having progressively smaller numbers of pixels are formed to create progressively smaller resolution levels of the image pyramid. Any of several pyramid generation techniques may be used in steps 108 and 110 to create the multiresolution Image 1 Pyramid and the multiresolution Image 2 Pyramid.

Figure 6:
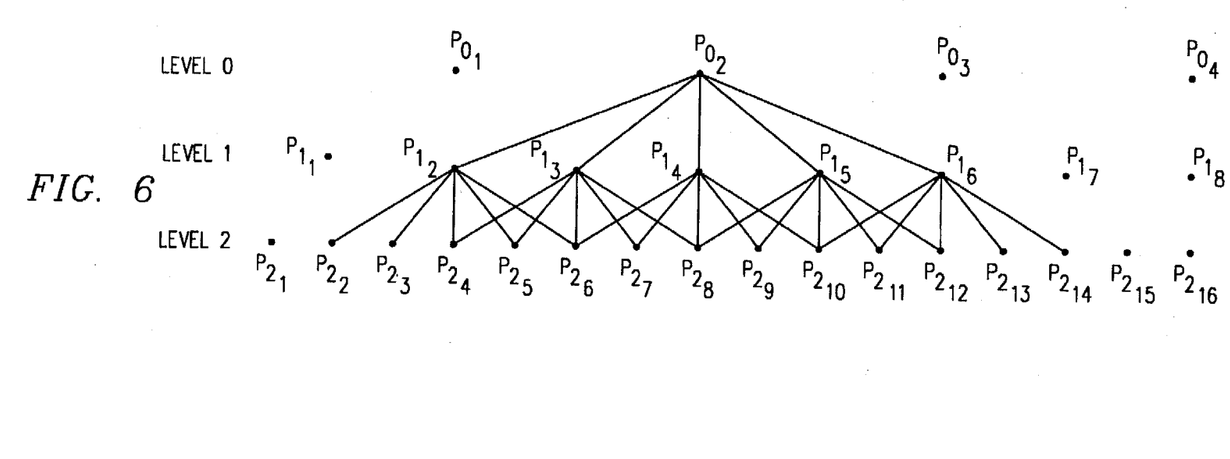
FIG. 6 is a conceptual illustration of one technique for generating pyramid levels, according to the optical flow determination technique of the preferred embodiment.

FIG. 6 is a conceptual illustration of one technique for generating pyramid levels according to the preferred embodiment. In particular, FIG. 6 illustrates three pyramid levels (Level 0, Level 1, and Level 2) each having a single dimension of pixels $P_{a_b}$, where a is the pyramid level, and where b is the pixel's number on the specified pyramid level. The three pyramid levels together form a single image pyramid. In the preferred embodiment, a variable reduction factor is used to create the different levels of the image pyramid. For clarity, a reduction factor of 2 is used in the following discussion. Thus, if the original image has a size of n×m pixels, successive lower resolution levels of the pyramid will have sizes of $\frac{n}{2} \times \frac{m}{2}, \frac{n}{4} \times \frac{m}{4}, \ldots$ pixels. In the conceptual illustration of single dimension pyramid levels in FIG. 6, Level 2 has sixteen pixels $P_{2_1}$ through $P_{2_{16}}$, Level 1 has eight pixels $P_{1_1}$ through $P_{1_8}$, and level 0 has four pixels $P_{0_1}$ through $P_{0_4}$.

In the preferred embodiment, pyramid generation starts at the pyramid's highest resolution level (designated as level p), which contains the most number of pixels. Each pixel value in the next pyramid level (designated as level P–1) having a smaller number of pixels is computed as a weighted average of pixel values in level p within a 5-by-5 window as shown in FIG. 6. For example, a value of pixel $P_{1_4}$ from Level 1 is computed as a weighted average of values of pixels $P_{2_5}$ through $P_{2_{10}}$ from Level 2 in FIG. 6. Each value in level p–2 is then computed from values in level p–1 by applying the same weighted averaging approach. Thus a value of pixel $P_{0_2}$ from Level 0 is computed as a weighted average of values of pixels $P_{1_2}$ through $P_{1_6}$ from Level 2 in FIG. 6.

A 5-by-5 weighting function is used because it provides adequate filtering at low computational cost; however, other weighting functions can be used. The weighting function is selected to approximate Gaussian filtering. Other filtering approximations can be obtained by changing the weighting function. The filtering operation is represented as:

$$E_{k-1}(i,j) = \sum_{m=-2}^{2} \sum_{n=-2}^{2} w(m,n) E_k(2i+m, 2j+n) \quad (1)$$

where $E_k(i,j)$ is the image intensity at pixel location (i,j) in level k of the pyramid, and w(m,n) is the weighting function.

Figure 7A:
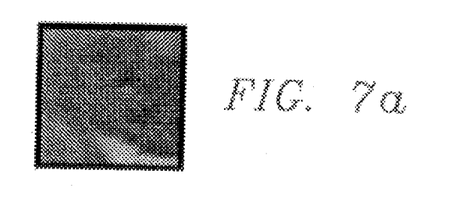
Figure 7B:
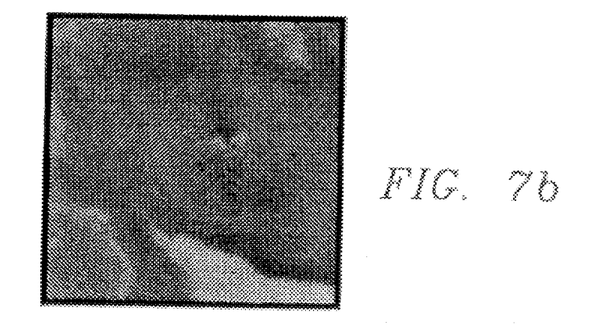
Figure 7C:
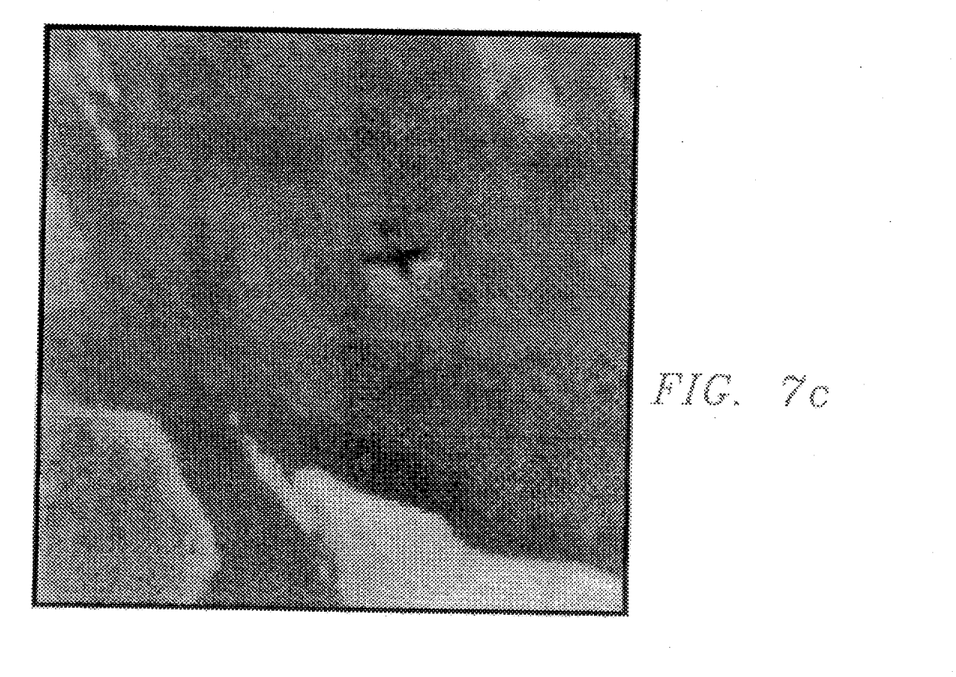

FIGS. 7a–c are exemplary images of three pyramid levels, each representing a different level of resolution for the image of FIG. 2a, in accordance with the pyramid generation technique of the preferred embodiment. Thus, FIG. 7a represents Level p–2, FIG. 7b represents Level p–1, and FIG. 7c represents Level p. Tables 1a and 2a, below, list exemplary pixel data from selected regions of FIGS. 7a and 7b, respectively, thereby listing exemplary pixel data from two pyramid levels. Tables 1b and 2b, below, list exemplary pixel data from two pyramid levels, respectively, representing the second image of the first target aircraft shown in FIG. 2b. Tables 1a–b and 2a–b list data in a (x,y,val) format, where val is an image gray scale value at pixel location (x,y).

TABLE 1a

| Pyramid Level 0 (FIGS. 2a and 3b) |
| --- |
| (20, 20, 111) (21, 20, 111) |
| (20, 21, 110) (21, 21, 109) |

TABLE 1b

Pyramid Level 0 (FIG. 2b)

(20, 20, 109) (21, 20, 108)
(20, 21, 108) (21, 21, 107)

TABLE 2a

Pyramid Level 1 FIGS. 2a and 3c)

(38, 38, 111)(38, 39, 111)(38, 40, 111)(38, 41, 110)(38, 42, 109)(38, 43, 108)(38, 44, 108)
(39, 38, 112)(39, 39, 112)(39, 40, 112)(39, 41, 111)(39, 42, 109)(39, 43, 108)(39, 44, 108)
(40, 38, 113)(40, 39, 113)(40, 40, 113)(40, 41, 111)(40, 42, 110)(40, 43, 109)(40, 44, 108)
(41, 38, 114)(41, 39, 114)(41, 40, 113)(41, 41, 111)(41, 42, 110)(41, 43, 109)(41, 44, 109)
(42, 38, 113)(42, 39, 113)(42, 40, 112)(42, 41, 110)(42, 42, 109)(42, 43, 108)(42, 44, 108)
(43, 38, 112)(43, 39, 112)(43, 40, 110)(43, 41, 109)(43, 42, 108)(43, 43, 107)(43, 44, 107)
(44, 38, 112)(44, 39, 111)(44, 40, 109)(44, 41, 108)(44, 42, 107)(44, 43, 107)(44, 44, 107)

TABLE 2b

Pyramid Level 1 (Bottom Level)(FIG. 2b)

(38, 38, 110)(38, 39, 109)(38, 40, 108)(38, 41, 108)(38, 42, 108)(38, 43, 108)(38, 44, 107)
(39, 38, 110)(39, 39, 109)(39, 40, 108)(39, 41, 108)(39, 42, 108)(39, 43, 108)(39, 44, 107)
(40, 38, 110)(40, 39, 109)(40, 40, 109)(40, 41, 109)(40, 42, 109)(40, 43, 109)(40, 44, 108)
(41, 38, 109)(41, 39, 109)(41, 40, 109)(41, 41, 109)(41, 42, 109)(41, 43, 109)(41, 44, 108)
(42, 38, 108)(42, 39, 107)(42, 40, 108)(42, 41, 108)(42, 42, 108)(42, 43, 107)(42, 44, 106)
(43, 38, 106)(43, 39, 106)(43, 40, 107)(43, 41, 107)(43, 42, 107)(43, 43, 105)(43, 44, 104)
(44, 38, 106)(44, 39, 106)(44, 40, 107)(44, 41, 107)(44, 42, 106)(44, 43, 104)(44, 44, 103)

Returning to FIG. 5, step 112 initializes a multiresolution optical flow field by determining a single level optical flow between the lowest resolution level, Level 0, of the Image 1 Pyramid and the lowest resolution level, Level 0, of the Image 2 Pyramid. Any of several optical flow determination techniques may be used to determine optical flow at a specified pyramid level, with each pixel of the pyramid level having an optical flow vector. For example, the optical flow determination can be based upon brightness, gradient constancy assumptions, and correlation or Fourier transform techniques.

In the preferred embodiment, the optical flow determination is based on gradient constancy assumptions, which are insensitive to global intensity changes. An optical flow field estimate (u,v) is determined at each pixel location by solving the following equations $$E_{xx}u + E_{xy}v + E_{xt} = 0 \quad (2)$$

$$E_{xy}u + E_{yy}v + E_{yt} = 0 \quad (3)$$

where the terms $E_{xx}, \ldots, E_{yt}$ are spatio-temporal derivatives of image intensity. In the preferred embodiment, the spatio-temporal derivatives of image intensity are computed according to $$E_x(i,j) = \frac{A_1(i+1,j) + A_1(i+1,j+1) - A_1(i,j) - A_1(i,j+1)}{2} \quad (4)$$

$$E_y(i,j) = \frac{A_1(i,j+1) + A_1(i+1,j+1) - A_1(i,j) - A_1(i+1,j)}{2} \quad (5)$$

$$E_{x_1}(i,j) = \frac{A_2(i+1,j) + A_2(i+1,j+1) - A_2(i,j) - A_2(i,j+1)}{2} \quad (6)$$

$$E_{y_1}(i,j) = \frac{A_2(i,j+1) + A_2(i+1,j+1) - A_2(i,j) - A_2(i+1,j)}{2} \quad (7)$$

$$E_{xx} = \frac{\begin{array}{l}E_x(i+1,j) + E_x(i+1,j+1) + E_{x_1}(i+1,j) + E_{x_1}(i+1,j+1) - \\ E_x(i,j) - E_x(i,j+1) - E_{x_1}(i,j) - E_{x_1}(i,j+1)\end{array}}{4} \quad (8)$$

$$E_{yy} = \frac{\begin{array}{l}E_y(i,j+1) + E_y(i+1,j+1) + E_{y_1}(i,j+1) + E_{y_1}(i+1,j+1) - \\ E_y(i,j) - E_y(i+1,j) - E_{y_1}(i,j) - E_{y_1}(i+1,j)\end{array}}{4} \quad (9)$$

$$E_{xy} = \frac{\begin{array}{l}E_x(i,j+1) + E_x(i+1,j+1) - E_x(i,j) - E_x(i+1,j) + \\ E_y(i+1,j) + E_y(i+1,j+1) - E_y(i,j) - E_y(i,j+1) + \\ E_{x_1}(i,j+1) + E_{x_1}(i+1,j+1) - E_{x_1}(i,j) - E_{x_1}(i+1,j) + \\ E_{x_1}(i,j+1) + E_{x_1}(i+1,j+1) - E_{x_1}(i,j) - E_{x_1}(i,j+1) +\end{array}}{8} \quad (10)$$

$$E_{xt} = \frac{\begin{array}{l}E_{x_1}(i,j) + E_{x_1}(i+1,j) + E_{x_1}(i,j+1) + E_{x_1}(i+1,j+1) - \\ E_x(i,j) - E_x(i+1,j) - E_x(i,j+1) - E_x(i+1,j+1)\end{array}}{4} \quad (11)$$

$$E_{yt} = \frac{\begin{array}{l}E_{y_1}(i,j) + E_{y_1}(i+1,j) + E_{y_1}(i,j+1) + E_{y_1}(i+1,j+1) - \\ E_y(i,j) - E_y(i+1,j) - E_y(i,j+1) - E_y(i+1,j+1)\end{array}}{4} \quad (12)$$

where $A_1$ and $A_2$ are first and second image data files representing a specified level of the Image 1 and Image 2 pyramids, respectively. For example, $A_1$ (i,j) is a gray scale value for pixel location (i,j) of image data file $A_1$ representing a specified level of the Image 1 pyramid.

The initialized multiresolution optical flow field determined at step 112 includes the optical flow vector (u,v) for each pixel at Level 0 of the Image 1 pyramid. The optical flow vector (u,v) for a pixel at Level 0 of the Image 1 pyramid indicates the pixel's direction of movement relative to Level 0 of the Image 2 pyramid, during the $\Delta t$ time period between Image 1 and Image 2.

After initializing the multiresolution optical flow field at step 112, step 114 increments to the next higher resolution pyramid level, Level 1. At step 116, the initialized multiresolution optical flow field is expanded to twice its size by multiplying each component of the initialized multiresolution optical flow field by 2, resulting in an expanded initialized multiresolution optical flow field at Level 1 designated as $O^1_0$, such that $O^1_a$ is the multiresolution optical flow field from pyramid Level a.

The expansion process moves from a lower resolution pyramid level to a higher resolution pyramid level, opposite from the pyramid generation process which moves from a higher resolution pyramid level to a lower resolution pyramid level. For clarity, an expansion factor of 2 is used in the following discussion. Multiplication of components by a factor of 2 is necessary to account for a pyramid level's increased pixel resolution relative to the immediately preceding smaller pyramid level. Thus, expansion from level k−1 to level k of the pyramid is achieved by:

$$E_k(i,j) = 4 \sum_{m=-2}^{2} \sum_{n=-2}^{2} w(m,n) E_{k-1}\left(\frac{i-m}{2}, \frac{j-n}{2}\right) \quad (13)$$

where $E_k(i,j)$ is the image intensity at pixel location (i,j) in level k of the pyramid, and w(m,n) is the weighting function. The weighting function used for expansion is identical to the weighting function used for pyramid generation. Only terms for which $\frac{i-m}{2}$ and $\frac{j-n}{2}$ are integers are used.

At step 118, $O^1_0$ is used to register Level 1 of the Image 2 pyramid relative to Level 1 of the Image 1 pyramid. Registration is performed on a pixel-by-pixel basis. Given successive images $I_1$ and $I_2$ and the optical flow field O between them, the purpose of image registration is to register $I_2$ relative to $I_1$ on a pixel-by-pixel basis using the optical flow field vector components of O. This is achieved by creating a new image $\tilde{I}_2$, according to $$\tilde{I}_2(x,y) = I_2(x+u\Delta t, y+v\Delta t) \quad (14)$$

where (u,v) represents the optical flow vector at location (x,y), and where $\Delta t$ is the time interval between images $I_1$ and $I_2$. Since the vector components (u,v) are typically real numbers, the quantities $x+u\Delta t$, $y+v\Delta t$ may not correspond to integer pixel locations. In such cases, bilinear interpolation is used to compute the image intensity values.

At step 120, residual optical flow is computed between Level 1 of the Image 1 pyramid and the registered image $\tilde{I}_2$. This residual optical flow field is designated as $O^0_1$, such that $O^0_a$ is the residual optical flow field at pyramid level a.

At step 122, the multiresolution optical flow field is updated by summing $O^1_0$ and $O^0_1$ to form $O^1_1$, a comprehensive multiresolution optical flow field at Level 1 of the Image 1 pyramid. Step 124 then determines whether more pyramid levels remain to be processed. If step 124 determines that more pyramid levels remain to be processed, then the optical flow determination process continues to the pyramid's next level having a higher level of resolution at step 114. The above steps 116–124 are then repeated.

This process continues from the pyramid's lowest resolution level through to the pyramid's highest resolution level, which has a resolution level equal to that of the original image. At the pyramid's highest resolution level, the multiresolution optical flow field accounts for incremental contributions by each of the pyramid's preceding levels. Table 3 lists exemplary optical flow u and v directional values computed for the data of Tables 1a–b and 2a–b, representing two levels of the Image 1 pyramid.

TABLE 3 u and v Values

| u values at pyramid level 2: −1.0 |
| v values at pyramid level 2: −2.0 |
| u values at pyramid level 1: −1.0 |
| v values at pyramid level 1: −2.0 |

After processing all pyramid levels, the multiresolution optical flow field at the pyramid's highest resolution level is further processed at step 126 by a segmentation technique, such as discontinuity edge detection or histogram segmentation, to isolate regions corresponding to moving targets. The moving target can be identified by centroid coordinates and a confidence measure.

In the preferred embodiment, the multiresolution optical flow field is subjected to discontinuity edge detection. For each pixel, the discontinuity edge detection computes a weighted sum of surrounding pixels. In the preferred embodiment, pixels surrounding a pixel at location (x,y) are weighted as shown in TABLE 4.

TABLE 4

| Weighting Values of Surrounding Pixels | |
|---|---|
| (x − 1, y + 1) | −1 |
| (x − 1, y) | −2 |
| (x − 1, y − 1) | −1 |
| (x, y + 1) | 0 |
| (x, y) | 0 |
| (x, y − 1) | 0 |
| (x + 1, y + 1) | 1 |
| (x + 1, y) | 2 |
| (x + 1), y − 1) | 1 |

The discontinuity edge detection technique forms a comprehensive discontinuity edge map of the entire multiresolution optical flow field. A boundary is indicated around the target region of movement by those pixels of the discontinuity edge map that have a minimum image gray scale value of 0 as shown in FIG. 2b, or that have a maximum image gray scale value of 255 as shown in FIG. 3b, for an 8-bit gray scale image.

Importantly, the optical flow determination technique of the preferred embodiment is not limited to determining a target's movement. For example, the optical flow determination technique of the preferred embodiment can be applied to determine any significant change in the target's appearance. Moreover, the optical flow determination technique of the preferred embodiment is equally advantageous for other applications besides MSMTI. For example, data for a sequence of images can be encoded according to the optical flow technique of the preferred embodiment, thereby compressing the image data. By compressing the image data in this manner, image motion is accurately represented by a smaller amount of data. Advantageously, this smaller amount of data can be recorded in a smaller data storage area, and it can be communicated in a shorter time period at a higher frequency than otherwise possible.

The present invention includes generating circuitry coupled to the sensor and operable to generate the first and the second multiresolution images from the first and second images, respectively, such that each of the multiresolution images has a plurality of levels of resolution, initilizing circuitry coupled to the generating circuitry and operable to initialize a multiresolutional optical flow field at the first one of the resolution levels and determining circuitry coupled to the generating circuitry and operable to determine a residual optical field flow at a second one of the resolution levels higher than the first resolution level, updating circuitry coupled to the determining circuitry and operable to update the multiresolution optical field flow by adding the residual optical flow field and processing circuitry coupled to the updating circuitry and operable to process the multiresolution optical flow field in response to the updated multiresolution optical flow field such that a change in the target is indicated between the first and second images. The present invention additionally includes control circuitry coupled to the processing circuitry and to the sensing circuitry and operable to control the sensing circuitry in response to the change in the target.

Although the present invention and its advantages have been described in detail, it should be understood that various changes, substitutions and alterations can be made herein without departing from the spirit and scope of the invention as defined by the appended claims.

What is claimed is:

1. A computer implemented method of determining optical flow between first and second images, comprising the steps of:
    sensing the first image and the second image by a sensor;
    generating first and second multi-resolution images from the first and second images, respectively, such that each of said first and second multi-resolution images includes a plurality of levels of resolution;
    initializing a multi-resolution optical flow field at a first resolution level of said levels of resolution;
    at each of said resolution levels higher than said first resolution level, determining a residual optical flow field at each of said higher resolution levels;
    updating said multi-resolution optical flow field by adding said residual optical flow field; and
    wherein said step of determining said residual optical flow field comprises the steps of:
        expanding said multi-resolution optical flow field from a lower one of said resolution levels to said higher resolution level;
        generating a registered image at said higher resolution level by registering said first multi-resolution image relative to said second multi-resolution image at said higher resolution level in response to said multi-resolution optical flow field after said expanding step; and
        determining said residual optical flow field by determining an optical flow field between said registered image and said first multi-resolution image at said higher resolution level.

2. The computer implemented method of claim 1, wherein said step of determining said residual optical flow field comprises the step of determining said residual optical flow field according to brightness.

3. The computer implemented method of claim 1, wherein said step of determining said residual optical flow field comprises the step of determining said residual optical flow field according to gradient constancy assumptions.

4. The computer implemented method of claim 1, wherein said step of determining said residual optical flow field comprises the step of determining said residual optical flow field according to correlation techniques.

5. The computer implemented method of claim 1, wherein said step of determining said residual optical flow field comprises the step of determining said residual optical flow field according to Fourier transform techniques.

6. The computer implemented method of claim 1, wherein the method comprises the step of providing a number of pixels of said lower resolution level being half a number of pixels of said higher resolution level.

7. A computer implemented method of determining optical flow between first and second images, comprising the steps of:
    sensing the first image and the second image by a sensor;
    generating first and second multi-resolution images from the first and second images, respectively, such that each of said first and second multi-resolution images includes a plurality of levels of resolution;
    initializing a multi-resolution optical flow field at a first resolution level of said levels of resolution;
    at each of said resolution levels higher than said first resolution level, determining a residual optical flow field at each of said higher resolution levels; and
    updating said multi-resolution optical flow field by adding said residual optical flow field; and
    wherein the method comprises the step of providing a number of pixels of a highest one of said resolution levels being substantially equal to a number of pixels of the first image; and
    wherein said step of generating said first multi-resolution image comprises the steps of:
        for each pixel of said highest resolution level, setting a value of said pixel equal to a value of a corresponding pixel of the first image; and
        for each pixel of a resolution level lower than said highest resolution level, setting a value of each said pixel according to a weighted averaging function of values of corresponding pixels of said highest resolution level.

8. The method of claim 7, wherein said weighted averaging function approximates Gaussian filtering.

* * * * *